US008191061B2

(12) United States Patent
Jun et al.

(10) Patent No.: US 8,191,061 B2
(45) Date of Patent: May 29, 2012

(54) METHOD FOR MANAGING INTERNAL SOFTWARE OF TERMINAL THROUGH DEVICE MANAGEMENT SERVER

(75) Inventors: Hae-Young Jun, Anyang-si (KR); Ji-Eun Keum, Suwon-si (KR); Wuk Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1289 days.

(21) Appl. No.: 11/839,662

(22) Filed: Aug. 16, 2007

(65) Prior Publication Data

US 2008/0046880 A1    Feb. 21, 2008

(30) Foreign Application Priority Data

Aug. 17, 2006  (KR) ........................ 10-2006-0077892

(51) Int. Cl.
*G06F 9/445* (2006.01)
*G06F 15/177* (2006.01)
*H04M 3/00* (2006.01)
(52) U.S. Cl. ......... 717/178; 717/175; 709/220; 455/419
(58) Field of Classification Search ........................ None
See application file for complete search history.

(56) References Cited

U.S. PATENT DOCUMENTS

| | | | | |
|---|---|---|---|---|
| 5,321,840 | A * | 6/1994 | Ahlin et al. | 717/178 |
| 5,887,254 | A * | 3/1999 | Halonen | 455/419 |
| 6,101,505 | A * | 8/2000 | Sun | 1/1 |
| 6,622,017 | B1 * | 9/2003 | Hoffman | 455/419 |
| 6,675,201 | B1 * | 1/2004 | Parkkinen | 709/216 |

(Continued)

FOREIGN PATENT DOCUMENTS

WO    WO 0201319 A2 *  3/2002

OTHER PUBLICATIONS

Open Mobile Alliance, Software Component Management Object Draft Version 1.0 [online], 2006 [retrieved Mar. 11, 2011], Retrieved from Internet <http://h71028.www7.hp.com/enterprise/downloads/OMATSSCOMOV1020060801D.pdf>, pp. 1-28.*

(Continued)

*Primary Examiner* — Tuan Dam
*Assistant Examiner* — Todd Aguilera
(74) *Attorney, Agent, or Firm* — Jefferson IP Law, LLP

(57) ABSTRACT

A method for managing software of a terminal in a device management system is provided. The device management server identifies if the memory area required for downloading and installing software is ensured in the terminal when the device management server has the software to be downloaded to the terminal. Then, the device management server acquires at least one among a usage rate during a predetermined period of time, a last use time, and a total number of times of usage for each software installed in the terminal when the required memory area is not ensured in the terminal. Next, the device management server selects software to be removed based on the usage rate, the last use time, etc., and notifies the terminal of the selected removal-targeted software. Then, the terminal removes the removal-targeted software when the terminal receives a removal acceptance input of the removal-targeted software from the user, and notifies the device management server of a result of the removal. Thereafter, the device management server transmits the software to be downloaded to the terminal.

20 Claims, 11 Drawing Sheets

U.S. PATENT DOCUMENTS

| | | | |
|---|---|---|---|
| 6,728,532 B1* | 4/2004 | Ahonen | 455/419 |
| 6,738,970 B1* | 5/2004 | Kruger et al. | 717/175 |
| 6,813,777 B1* | 11/2004 | Weinberger et al. | 725/76 |
| 6,816,944 B2* | 11/2004 | Peng | 711/133 |
| 6,874,075 B2* | 3/2005 | Jerding et al. | 711/170 |
| 7,158,176 B2* | 1/2007 | Tokkonen et al. | 348/231.99 |
| 7,184,759 B2* | 2/2007 | Date et al. | 455/419 |
| 7,222,341 B2* | 5/2007 | Forbes et al. | 717/170 |
| 7,281,016 B2* | 10/2007 | Yada | 1/1 |
| 7,379,731 B2* | 5/2008 | Natsuno et al. | 455/412.1 |
| 7,539,834 B2* | 5/2009 | Jerding et al. | 711/170 |
| 7,587,473 B2* | 9/2009 | Benco et al. | 709/220 |
| 7,710,912 B1* | 5/2010 | Myles et al. | 370/328 |
| 7,783,729 B1* | 8/2010 | Macaluso | 709/220 |
| 7,894,803 B2* | 2/2011 | Kamada | 455/414.3 |
| 2001/0052052 A1* | 12/2001 | Peng | 711/133 |
| 2002/0049826 A1* | 4/2002 | Ariga | 709/216 |
| 2002/0052872 A1* | 5/2002 | Yada | 707/6 |
| 2002/0123336 A1* | 9/2002 | Kamada | 455/420 |
| 2002/0144248 A1* | 10/2002 | Forbes et al. | 717/167 |
| 2003/0236867 A1* | 12/2003 | Natsuno et al. | 709/220 |
| 2004/0158829 A1* | 8/2004 | Beresin et al. | 717/178 |
| 2005/0129042 A1* | 6/2005 | Muhonen et al. | 370/412 |
| 2005/0289235 A1* | 12/2005 | Suematsu et al. | 709/230 |
| 2006/0047576 A1* | 3/2006 | Aaltonen et al. | 705/26 |
| 2006/0048146 A1* | 3/2006 | Oh | 717/178 |
| 2007/0204125 A1* | 8/2007 | Hardy | 711/170 |
| 2011/0010701 A1* | 1/2011 | Cooper et al. | 717/175 |

OTHER PUBLICATIONS

Kortuem, G., et al., "On-Demand Delivery of Software in Mobile Environments", Nomadic Computing Workshop, 11th International Parallel Processing Symposium [online], 1997 [retrieved May 1, 2012], Retrieved from Internet: <http://citeseer.ist.psu.edu/viewdoc/summary?doi=10.1.1.35.9264>, pp. 1-11.*

Moessner, K., et al., "Terminal Reconfigurability—The Software Download Aspect", First International Conference on Mobile Communication Technologies [online], 2000 [retrieved May 1, 2011], Retrieved from Internet: <http://ieeexplore.ieee.org/xpls/abs_all.jsp?arnumber=858293>, pp. 326-330.*

* cited by examiner

METHOD FOR MANAGING INTERNAL SOFTWARE OF TERMINAL THROUGH DEVICE MANAGEMENT SERVER

PRIORITY

This application claims the benefit under 35 U.S.C. §119 (a) of a Korean patent application filed with the Korean Intellectual Property Office on Aug. 17, 2006 and assigned Serial No. 2006-77892, the entire disclosure of which is hereby incorporated by reference.

BACKGROUND OF THE INVENTION

1. Field of the Invention

The present invention relates to a device management system. More particularly, the present invention relates to a method for managing internal software of a terminal by a device management server.

2. Description of the Related Art

In general, mobile terminals which implement mobile communication may be subjected to errors caused by hardware or software of the terminals themselves while being used. Mobile terminal may also be subjected to errors caused by problems occurring in a communication network while providing service in cooperation with the communication network. In order to detect such problems and take actions accordingly, a function for diagnosis and monitoring of the terminals is required. Accordingly, device management systems have been implemented for mobile terminals, which remotely manage the mobile terminals over the communication network. The device management system for a mobile terminal is constructed such that a Device Management server (DM server) is connected to the mobile terminal including a Device Management client (DM client) over a communication network.

In order to manage the mobile terminal, the DM server can collect information about the inventory of software existing in the mobile terminal, can install new software, and can update/remove installed software, by means of a device management protocol and a Software COmponent Management Object (SCOMO).

The SCOMO is a Management Object (MO) defined for collecting various information about software existing in a mobile terminal, and is configured as shown in FIG. 1. FIG. 1 is a view illustrating the configuration of a conventional SCOMO. A SCOMO may be largely classified into an inventory node and a download node. Furthermore, the inventory node may be classified into a deployed node and a delivered node. The MO defines parameters or variables, which must be shared between a DM server and a DM client, in the form of a tree as shown in FIG. 1. The MO is utilized in order for the DM server to obtain or change the values of internal parameters or variables of the mobile terminal. The MO contains information relating to a plurality of mobile terminals, in which the SCOMO is an MO for software component management and may be largely classified into an inventory node and a download node. The inventory node has stored values of software components currently installed or downloaded in the mobile terminal, and includes a deployed node for storing information about software currently installed and used in the mobile terminal, and a delivered node for containing information about software which has been downloaded and stored in the mobile terminal but has not yet been installed therein. The download node contains information about software which is scheduled to be newly downloaded or is currently being downloaded from the DM server to the mobile terminal. A plurality of nodes <x> may be located as lower nodes for each of the deployed node, delivered node, and download node, and each node <x> represents one software component and has a title established according to a corresponding situation. That is, node <x> represents a mobile terminal's function to be managed, and may correspond to a camera, Internet access, a DMB reception, a user's keypad input, an access to internal data of a mobile terminal, etc.

Node <x>, which is a software component, includes lower nodes for collecting information relating to software to be downloaded by a mobile terminal, to software to be installed or upgraded in a mobile terminal, and to software installed in a mobile terminal. The lower nodes include, for example, ID, data, title, version, installation option, descriptor, content type, operation, state value, and environment type nodes. Among the lower nodes, the installation option node stores options to be used when software is installed, the descriptor node stores a descriptor for basic classification, the content type node stores information about whether a software component corresponds to an execution program type or a library type, the operation node arranges execution nodes which the DM server can execute, the state value node expresses whether corresponding software is in an active state or in an inactive state, and the environment type node stores information about an execution environment platform.

A conventional procedure in which a DM server transmits certain software to a mobile terminal and installs the transmitted software in the mobile terminal is illustrated in FIG. 2. FIG. 2 is a view illustrating a conventional downloading/installing procedure. In step 31, a DM server 20 generates a download lower node about software to be downloaded to a SCOMO of a mobile terminal, and transmits the generated node to the mobile terminal. In step 33, the DM server 20 executes and transmits an execution node which is a lower node of the download load of the SCOMO. Thereafter, when the memory capacity of the mobile terminal is insufficient to download corresponding software thereto in step 35, a corresponding DM client 10 transmits an error message (e.g., "Download/Install failed due to device being out of memory") to the DM server 20 and interrupts the downloading operation in step 37. Accordingly, the mobile terminal fails in downloading and/or installing certain software. That is, when the memory capacity of a mobile terminal is poor, there is no way for the DM server 20 to solve the problem.

SUMMARY OF THE INVENTION

An aspect of the present invention is to address at least the above-mentioned problems and/or disadvantages occurring in the prior art and to provide at least the advantages described below. Accordingly, an aspect of the present invention is to provide a method for identifying whether a mobile terminal has a sufficient memory capacity before the DM server performs a procedure of transmitting and installing predetermined software to a mobile terminal, and, when an available memory capacity of the mobile terminal is insufficient, either not starting a downloading task or ensuring the memory capacity of the mobile terminal to store the predetermined software according to circumstances.

Another aspect of the present invention is to provide a method for searching for software rarely used or unused in the recent past from among software stored in the mobile terminal, removing the searched software upon the user's agreement so as to ensure a sufficient memory capacity, and then downloading/installing software to be added from the DM server to the mobile terminal.

In accordance with an aspect of the present invention, a method for managing internal software of a terminal by a device management server is provided. The method includes identifying if a memory area required for downloading and installing software is ensured in the terminal when the device management server is to download the software to the terminal, acquiring, by the device management server, information about a usage rate, a last use time, a total number of times of usage, etc., for each software installed in the terminal, when the required memory area is not ensured in the terminal, selecting, by the device management server, software to be removed based on the usage rate, the last use time, etc., and notifying the terminal of the selected removal-targeted software, removing, by the terminal, the removal-targeted software, when the terminal receives a removal acceptance input of the removal-targeted software from the user, and notifying the device management server of a result of the removal and transmitting, by the device management server, the software to be downloaded to the terminal.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
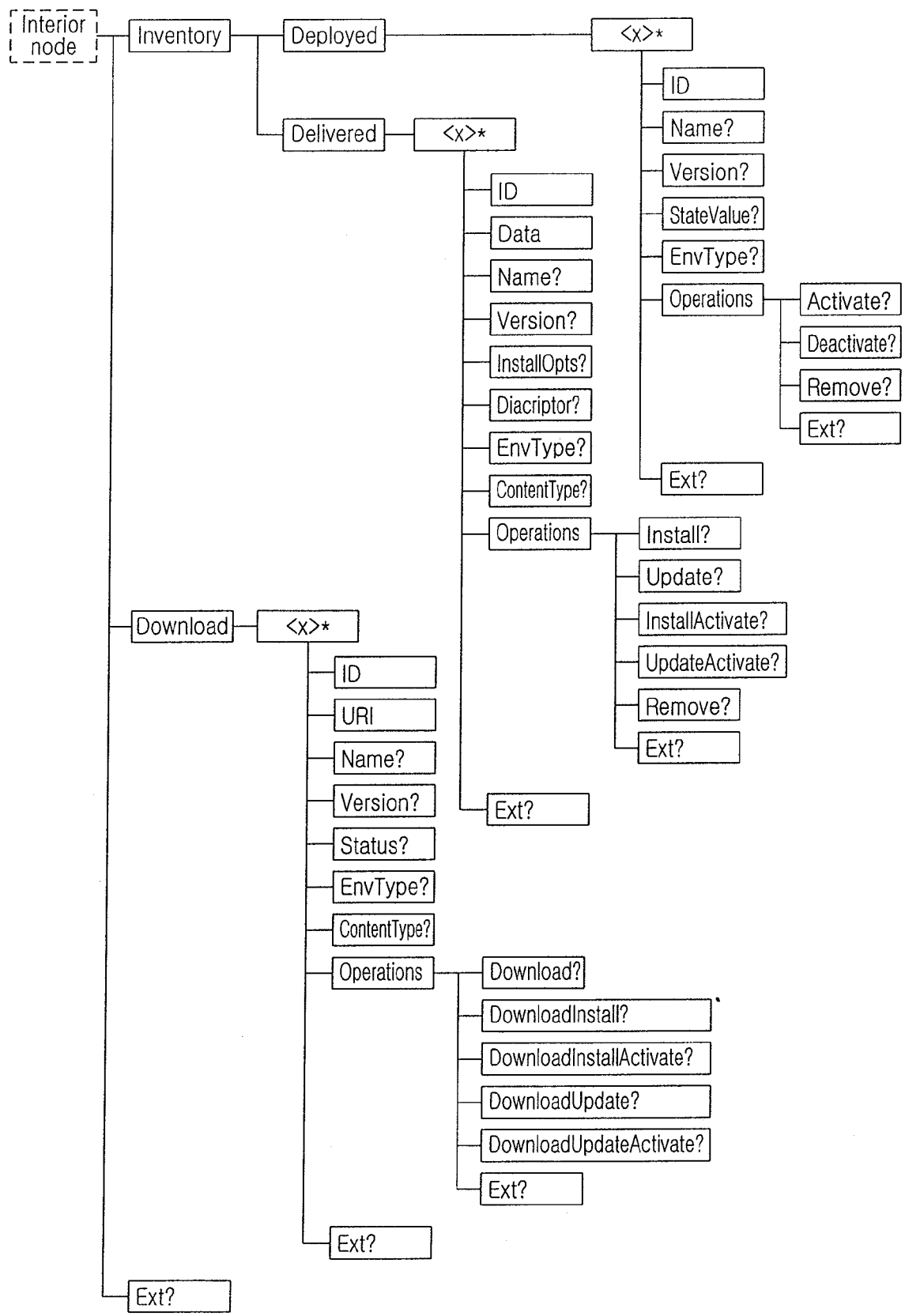
FIG. 1 is a view illustrating the configuration of a conventional SCOMO.
Figure 2:
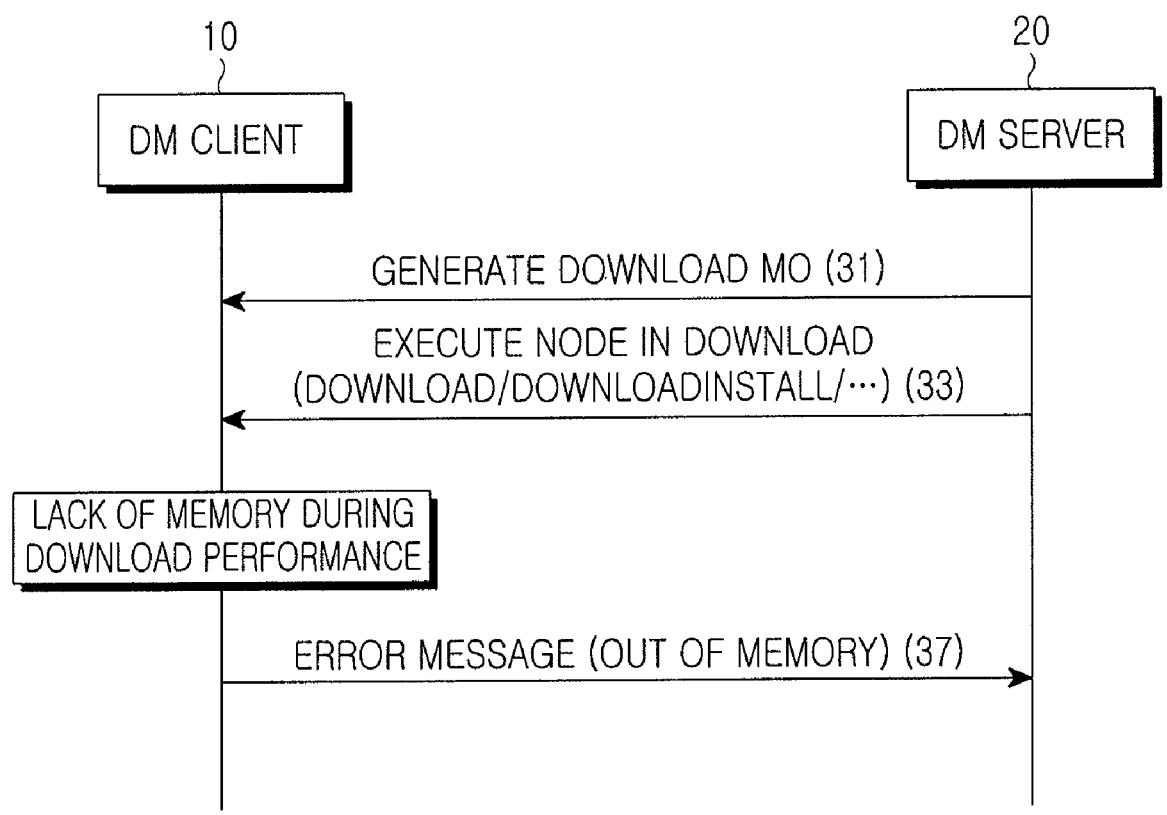
FIG. 2 is a view illustrating a conventional downloading/installing procedure.
Figure 3:
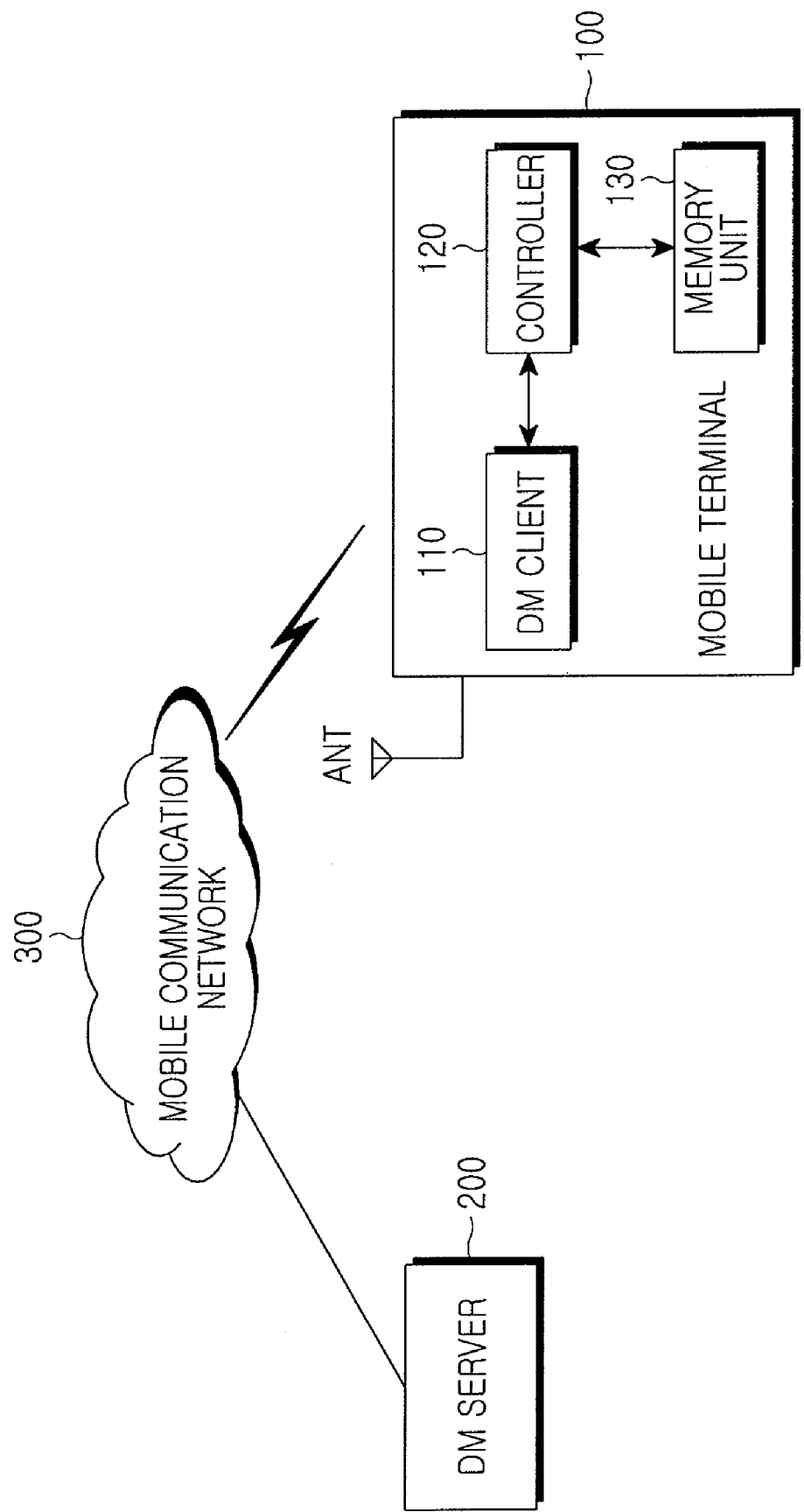
FIG. 3 is a block diagram illustrating the configuration of a device management system according to an exemplary embodiment of the present invention.

A device management system according to an exemplary embodiment of the present invention is illustrated in FIG. 3. The device management system includes a device management server (DM server) 200, a mobile terminal 100 containing a device management client (DM client) 110, and a mobile communication network 300.

The DM server 200 stores device information about various mobile terminals, access information to the mobile terminals which are management objects, and various applications for coping with various errors which may occur in the mobile terminals. The device information includes information about software and hardware generally contained in the mobile terminals. The access information includes information, such as a telephone number, required for accessing each mobile terminal through the mobile communication network 300. According to an exemplary embodiment of the present invention, the DM server 200 can transmit and install new software to a mobile terminal to be managed, and can update certain software pre-installed in the mobile terminal. To this end, the DM server 200 identifies whether a memory area large enough to install new software in the mobile terminal is available and ensured. Identification of a memory area may be achieved in a manner such that either the mobile terminal identifies an available memory area and transmits the result of the identification to the DM server 200, or the DM server 200 directly collects information about an available memory area of a mobile terminal and identifies whether a sufficient memory area is ensured. When a memory area large enough to install the new software is not ensured as a result of the identification, the DM server 200 collects information about software rarely used or unused during a period of time from among software pre-installed in the mobile terminal, and selects software to be removed based on the collected information. Thereafter, the DM server 200 confirms whether or not removal of the selected software is allowed from the user through a user interface of the mobile terminal, and removes the selected software when the user allows the removal. Thereby, a large enough memory area of the mobile terminal in order to install the new software is ensured. In order for the DM server 200 to collect information required for downloading and installing software, as described above, a relevant node is newly defined in a Software COmponent Management Object (SCOMO).

The mobile terminal 100 is managed by the DM server 200, and includes a DM client 110, a controller 120 and a memory unit 130. The controller 120 controls the overall operation of the mobile terminal 100, and cooperates with the DM client 110. The memory unit 130 stores programs for the processing and control operations of the controller 120, reference data, and various updatable data for storage, and provides a working memory for the controller 120. In addition, the memory unit 130 stores various software installed in the mobile terminal 100, provides a memory area required for installation and execution of software, and stores a SCOMO received from the DM server 200. The DM client 110 cooperates with the controller 120 so as to manage software of the mobile terminal 100 according to management of the DM server 200. That is, the DM client 110 analyzes a message received from the DM server 200 and performs an operation for downloading new software. Therefore, the DM client 110 collects information corresponding to nodes constituting the SCOMO, stores the collected information in each corresponding node, and thereafter, provides the DM server 200 with software-related information stored in the SCOMO when receiving a SCOMO acquisition request from the DM server 200.

Since a SCOMO is defined between the DM server 200 and DM client 110, the DM client can share information about internal software of the mobile terminal 100 with the DM server 200 by means of a DM protocol and the SCOMO. That is, the DM server 200 configures a SCOMO for information to be collected from the mobile terminal or information to be provided to the mobile terminal with respect to software which is installed or has been installed in the mobile terminal, and records information to be provided to the mobile terminal in a part of the nodes constituting the SCOMO. Then, the mobile terminal reads the information included in the SCOMO and applies the information to the operation of the mobile terminal, or inserts relevant information into corresponding nodes constituting the SCOMO. Thereafter, the DM server 200 reads the SCOMO of the mobile terminal, collects information about software of the mobile terminal, and determines the next operation based on the collected information.

Figure 4:
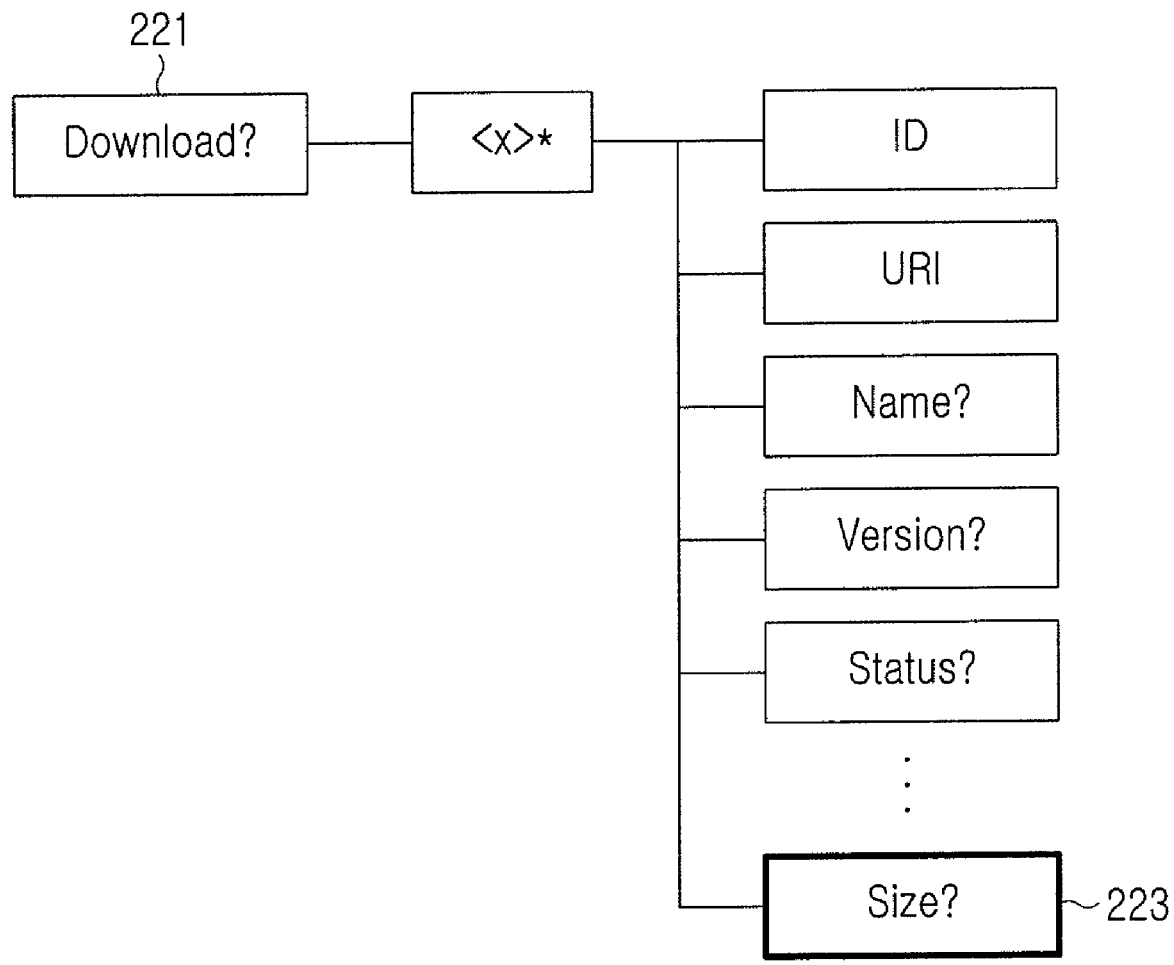
FIG. 4 is a view illustrating the configuration of a SCOMO including a download software size node according to an exemplary embodiment of the present invention.

According to an exemplary embodiment of the present invention, a new node either for downloading/installing new software to the mobile terminal or for updating/removing software pre-installed in the mobile terminal is defined in a SCOMO. Nodes of a SCOMO newly-defined according to an exemplary embodiment of the present invention are illustrated in FIGS. 4 to 9. FIG. 4 is a view illustrating a download software size node which represents the size of new software to be downloaded and installed according to an exemplary embodiment of the present invention. The download software size node 223 may be added as a lower node of a download software component node 221 of a SCOMO. With the download software size node, the DM server 200 provides the mobile terminal with information about the size of software to be downloaded. In the case of using the download software size node 223, the DM server 200 does not directly identify the size of an available space of the mobile terminal, and at the moment of generating and executing a software download MO, the DM client of the mobile terminal may check the download software size node, compare its own available space with the checked size, and notify the DM server 200 of a lack of memory space.

Figure 5:
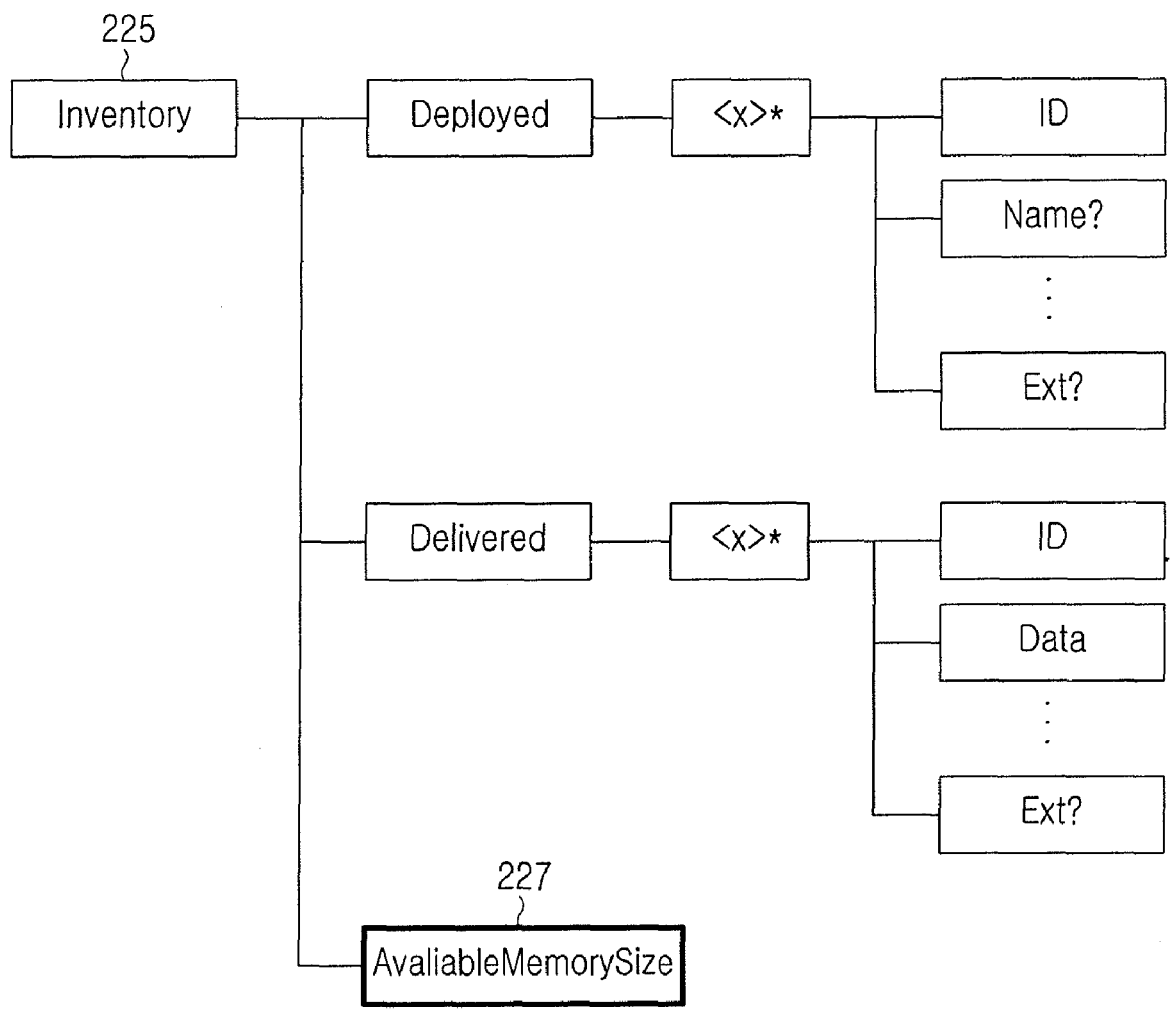
FIG. 5 is a view illustrating the configuration of a SCOMO including an available memory size node according to an exemplary embodiment of the present invention.

FIG. 5 is a view illustrating an available memory size node which represents the size of an available memory of the mobile terminal according to an exemplary embodiment of the present invention. The available memory size node 227 may be added as a lower node of an inventory node 225. The mobile terminal provides the DM server 200 with information about the size of the available memory of the mobile terminal through the available memory size node 227.

Figure 6:
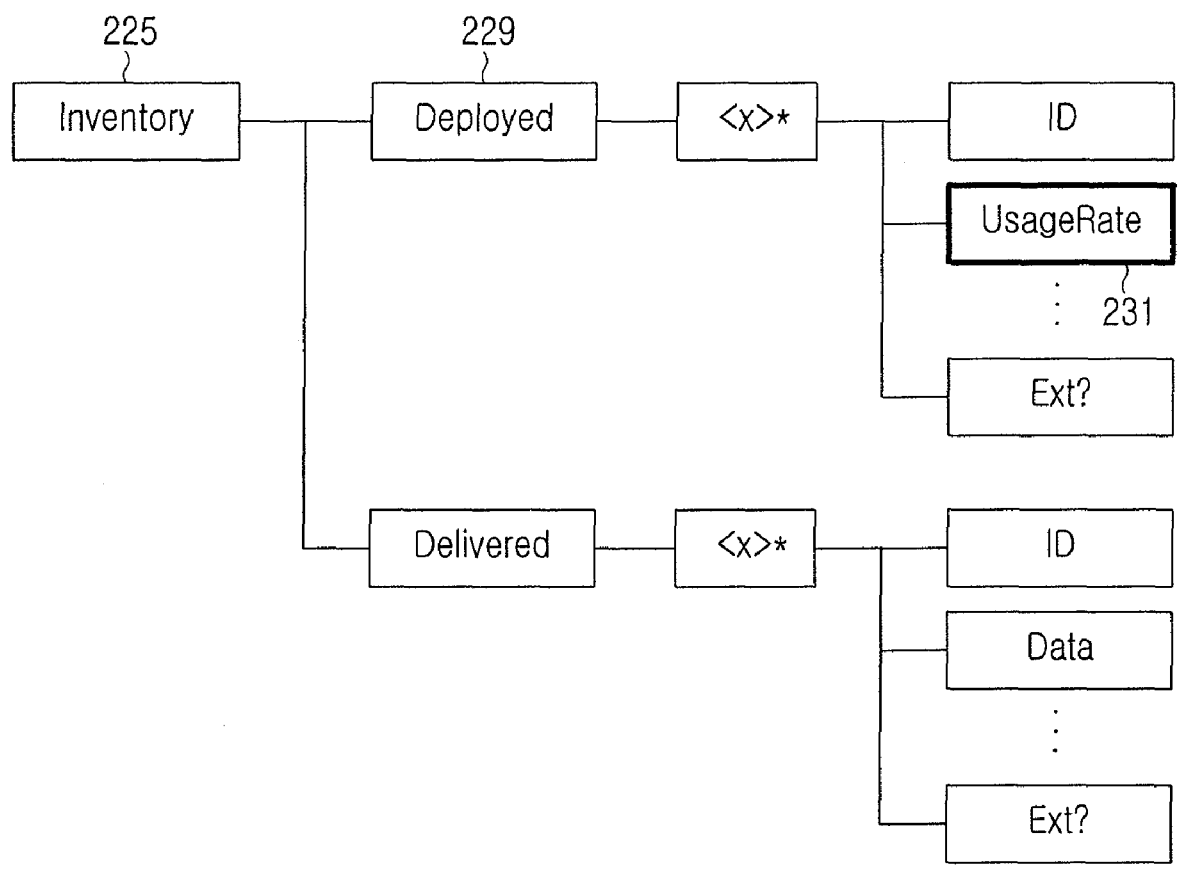
FIG. 6 is a view illustrating the configuration of a SCOMO including a usage rate node according to an exemplary embodiment of the present invention.

FIG. 6 is a view illustrating a usage rate node which represents the usage rate of software installed in the mobile terminal according to an exemplary embodiment of the present invention. The usage rate node 231 may be added as a lower node of a deployed software component node 229, which is a lower node of an inventory node 225. The mobile terminal transmits information about the usage rate of each piece of pre-installed software to the DM server 200. The usage rate represents the number of times of usage generated, for example, during one recent month. Of course, the time period may be set differently depending on implementation. Also, the mobile terminal may periodically transmit the number of times installed software was used over a specific period of time to the DM server 200 though the usage rate node 231.

Figure 7:
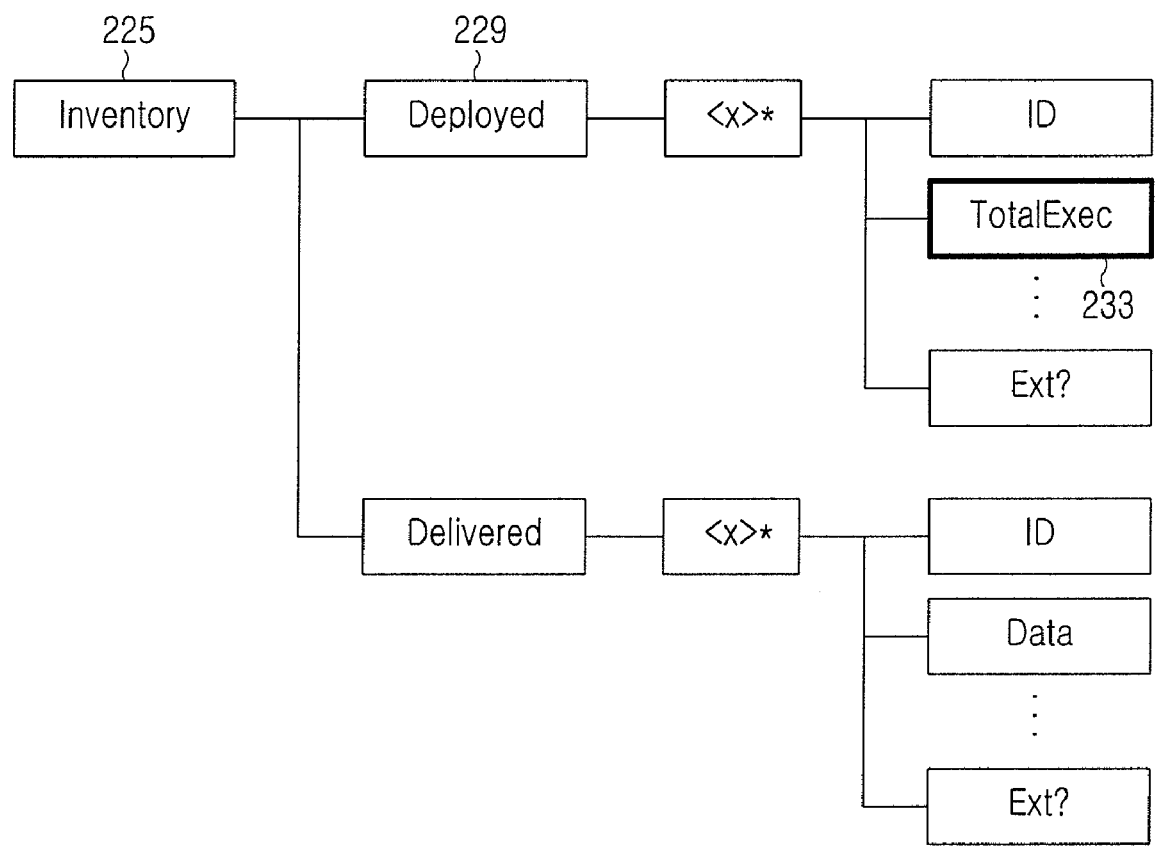
FIG. 7 is a view illustrating the configuration of a SCOMO including a total execution number node according to an exemplary embodiment of the present invention.

FIG. 7 is a view illustrating a total execution number (TotalExec) node which represents a total number of times of execution after software is installed in the mobile terminal according to an exemplary embodiment of the present invention. The total execution number node 233 may be configured as a lower node of the deployed software component node 229, which is a lower node of an inventory node 225. The mobile terminal may periodically transmit a total number of times of execution of software installed in the mobile terminal to the DM server 200 through the total execution number node 233.

Figure 8:
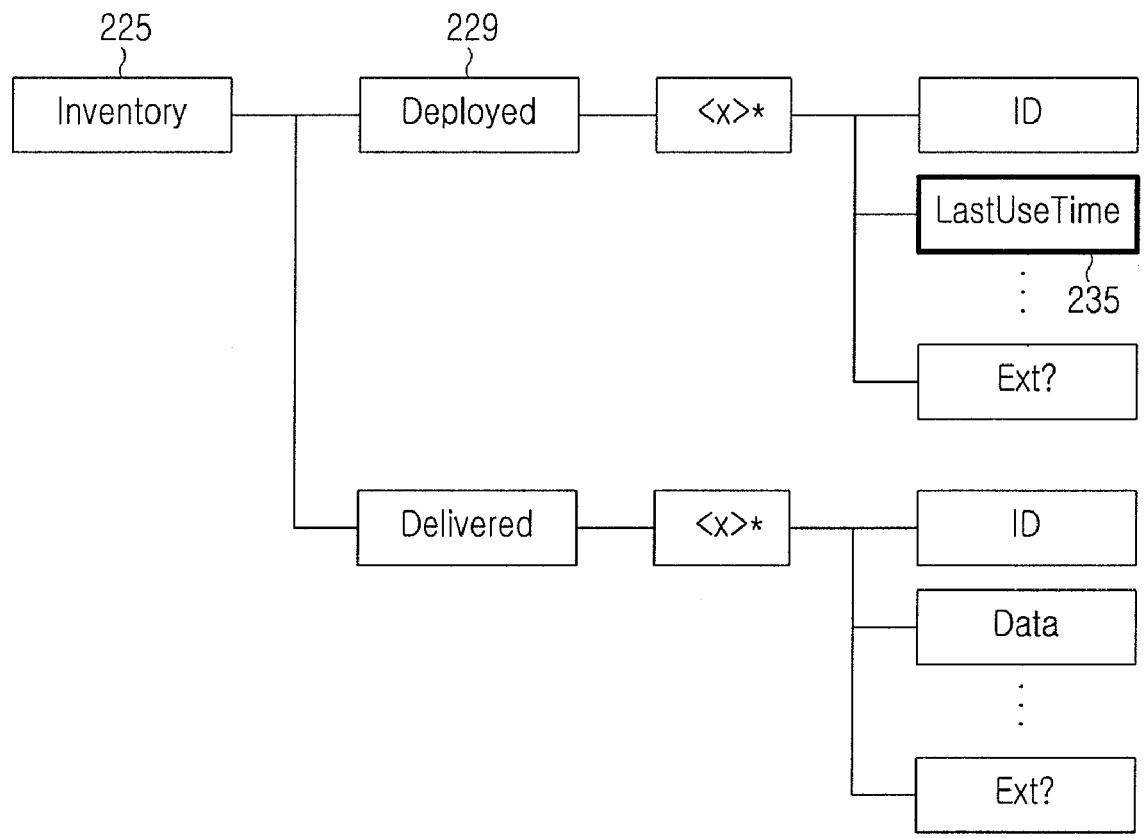
FIG. 8 is a view illustrating the configuration of a SCOMO including a last use time node according to an exemplary embodiment of the present invention.

FIG. 8 is a view illustrating a last use time node which represents the last use time of software installed in the mobile terminal according to an exemplary embodiment of the present invention. The last use time node 235 may be added as a lower node of the deployed software component node 229, which is a lower node of an inventory node 225. The mobile terminal may periodically provide the DM server 200 with the last use time of software installed in the mobile terminal through the last use time node 235. In addition to the usage rate and the last use time of software in the mobile terminal, a node representing the importance level of each piece of software may be configured as a lower node.

Figure 9:
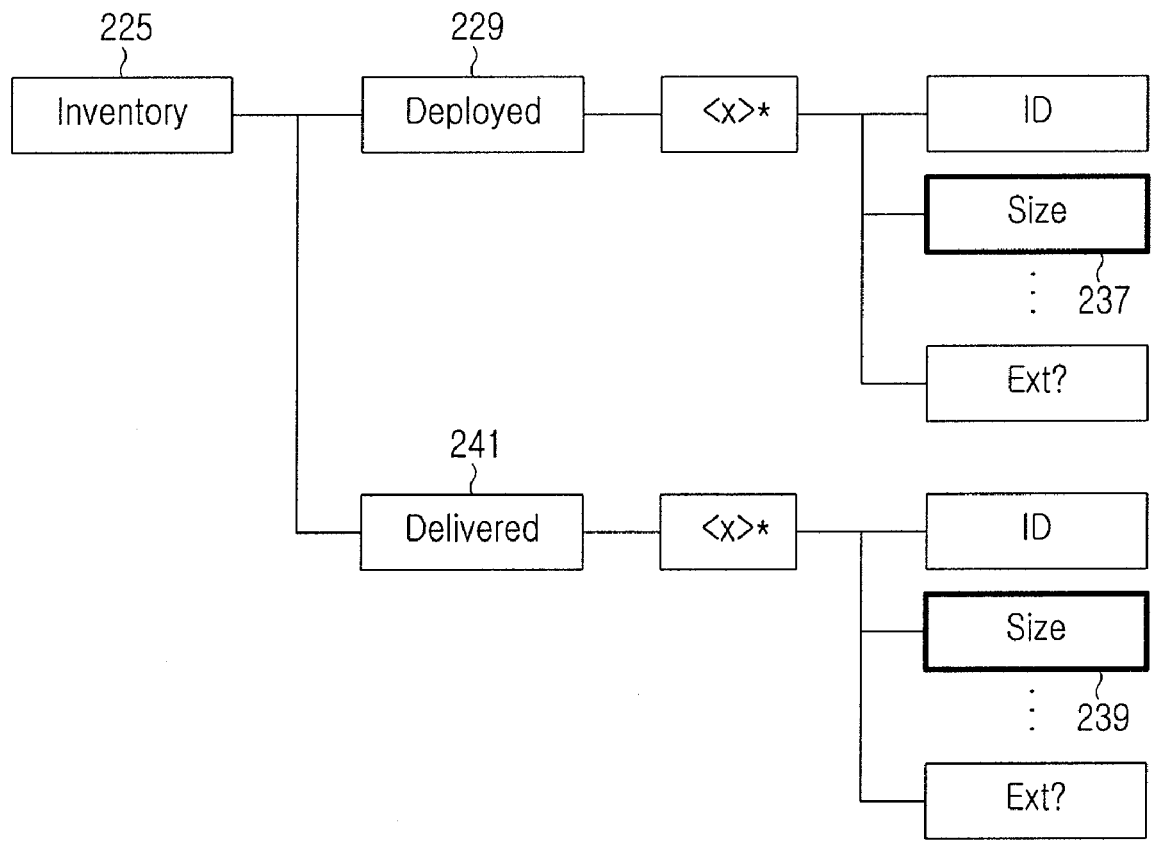
FIG. 9 is a view illustrating the configuration of a SCOMO including an installed-software size node according to an exemplary embodiment of the present invention.

FIG. 9 is a view illustrating an installed-software size node which represents the size of software installed in the mobile terminal according to an exemplary embodiment of the present invention. The installed-software size nodes 237 and 239 may be added as lower nodes of the deployed software component node 229 and the delivered software component node 241, respectively, which are both lower nodes of an inventory node 225. The mobile terminal may transmit the size of the software installed in the mobile terminal to the DM server 200 through the installed-software size nodes 237 and 239. In the case of utilizing the installed-software size nodes 237 and 239, the DM server 200 can ensure a storage space as much as a memory size necessary for downloading new software to the mobile terminal by determining removal-targeted software and the number of removal-targeted pieces of software, and removing the determined pieces of software at one time. Otherwise, the DM server 200 may show the user a list of pieces of removable software so that the user can select at least one piece of software from the list, while directly displaying the size of the memory space ensured according to the selection of software.

Figure 10:
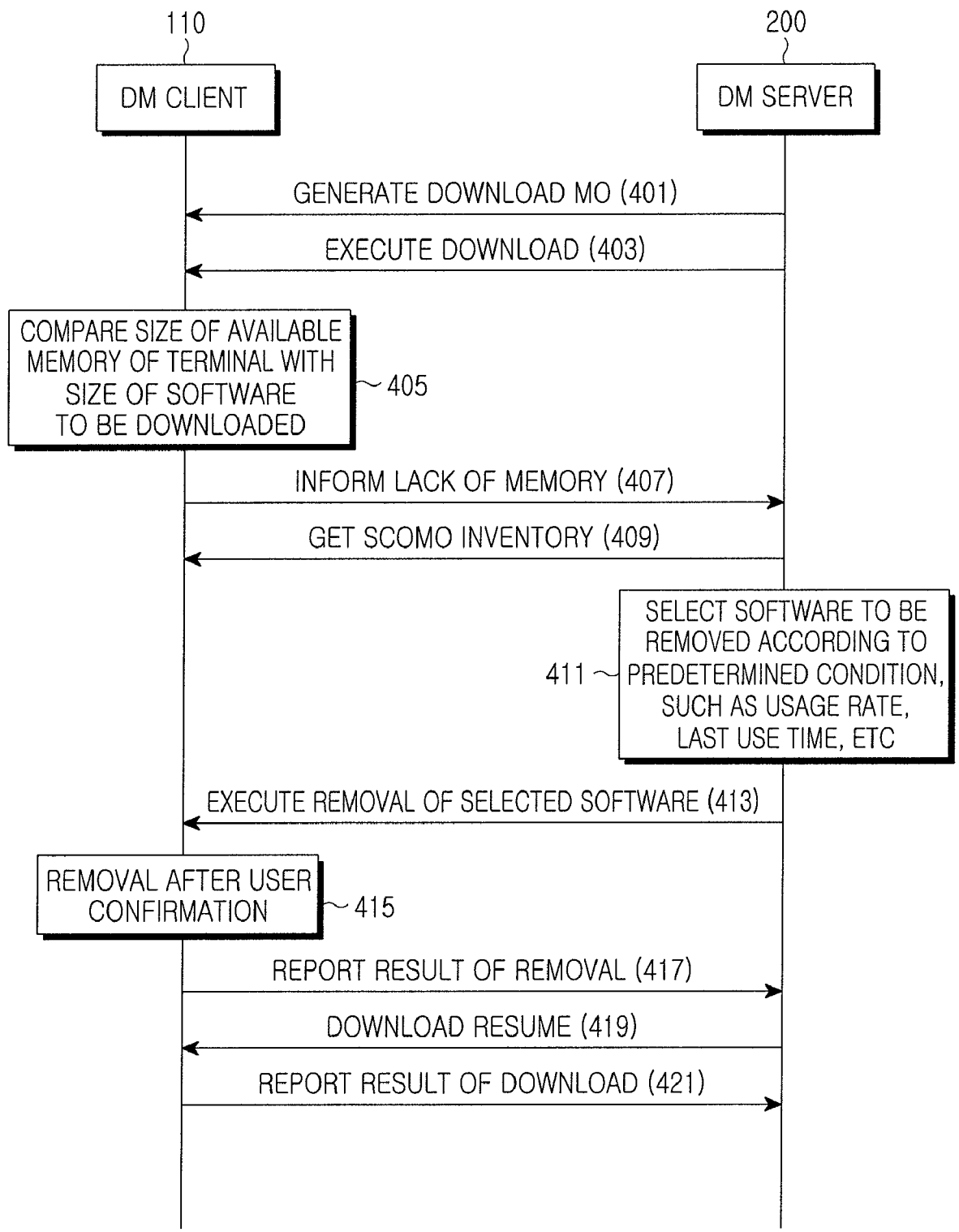
FIG. 10 is a view illustrating a downloading procedure according to an exemplary embodiment of the present invention.

Hereinafter, a procedure of downloading and installing, by the mobile terminal 100, software provided from the DM server 200 according to an exemplary embodiment of the present invention in the device management system having the aforementioned construction will be described with reference to FIG. 10. FIG. 10 is a view illustrating a downloading procedure according to an exemplary embodiment of the present invention.

In step 401, the DM server 200 generates and transmits a download MO for downloading/installing/updating new software to the DM client 110 of the mobile terminal 100. In this case, the download MO is configured in the form of a SCOMO, and includes a download software size node 223 illustrate in FIG. 4. That is, information about the size of software to be downloaded is provided to the mobile terminal 100. In step 403, a downloading operation is executed. As the downloading operation is executed, the DM client 110 of the mobile terminal 100 compares the size of software to be downloaded, which is contained in the download MO, with the size of the current available memory of the mobile terminal 100 in step 405. When the size of the available memory is insufficient, the DM client 110 notifies the DM server 200 of a lack of available memory capacity in step 407. When receiving such a message, the DM server 200 requests the DM client 110 of the mobile terminal 100 to provide a SCOMO inventory in step 409, so as to read information about software which has been deployed in or delivered to the mobile terminal 100. As shown in FIGS. 5 to 9 according to exemplary embodiments of the present invention, the SCOMO inventory may include the available memory size node 227, the usage rate node 231, the total execution number node 233, the last use time node 235, the installed-software size nodes 237 and 239, etc. Thereafter, in step 411, the DM server 200 identifies at least one selected from the group consisting of the usage rate, the last use time, and a preset importance level of each piece of software installed in the mobile terminal 100 by using information included in the acquired SCOMO inventory, and selects removal-targeted pieces of software. As an example, the DM server 200 may receive the usage rate of each piece of acquired software from the mobile terminal 100 and select removal-targeted pieces of software in the sequence from the smallest usage rate to the greatest-usage rate. In an exemplary embodiment, the DM server 200 may periodically receive a total number of times of use of each piece of software from the mobile terminal 100, and select removal-targeted pieces of software by checking the received total numbers of times of usage. As another example, the DM server 200 may receive the last use time of each piece of software from the mobile terminal 100 and select removal-targeted pieces of software in the sequence from the oldest use time to the latest use time in terms of the last use time. As yet another example, the DM server 200 may select removal-targeted pieces of software in ascending order of an importance level preset based on importance levels preset for each piece of software, in which piece of software having higher than a predetermined importance level may be excluded from a removal-targeted object. In this case, two or more pieces of software may be selected as removal-targeted software. In order to select a plurality of removal-targeted pieces of software, the DM server 200 makes reference to the size of installed software and the size of the available memory of the mobile terminal 100, which have been transmitted from the mobile terminal 100.

When the DM server 200 has selected removal-targeted pieces of software, the DM server 200 notifies the DM client 110 in the mobile terminal 100 of the removal-targeted pieces of software so as to execute the removing operation in step 413. The DM client 110 notifies the user of the removal-targeted pieces of software through a user interface, and removes corresponding pieces of software when receiving an acceptance input from the user in step 415. In an exemplary embodiment, the DM client 110 of the mobile terminal 100 may notify the user of one removal-targeted piece of software, or of a plurality of removal-targeted pieces of software. When the DM client 110 notifies the user of a plurality of removal-targeted pieces of software, the DM client 110 may provide the user with a list of removal-targeted pieces of software so that the user can finally select removal-targeted pieces of software. In this case, the size of a memory area ensured according to the selection of software to be removed and the size of a memory capacity necessary for downloading/installing new software are compared and displayed. Also, in order to ensure a memory space as much as needed by making reference to the size of the new software, the DM server 200 requests the user to select and remove a plurality of pieces of software. Otherwise, regardless of an acceptance input from the user, the DM server 200 may remove the selected removal-targeted pieces of software. Thereafter, the DM client 110 reports a result of the removal to the DM server 200 in step 417. When the DM server 200 has received the removal result report, the DM server 200 performs a downloading operation in step 419. When the downloading operation has been completed, the DM client 110 reports a result of the downloading to the DM server 200 in step 421, and installs the new software. In an exemplary implementation of the procedure illustrated in FIG. 10, the downloading execution process of step 403 may be omitted, and/or the new software may be downloaded after a series of determining the size of an available memory area and the removal result report of step 417.

Figure 11:
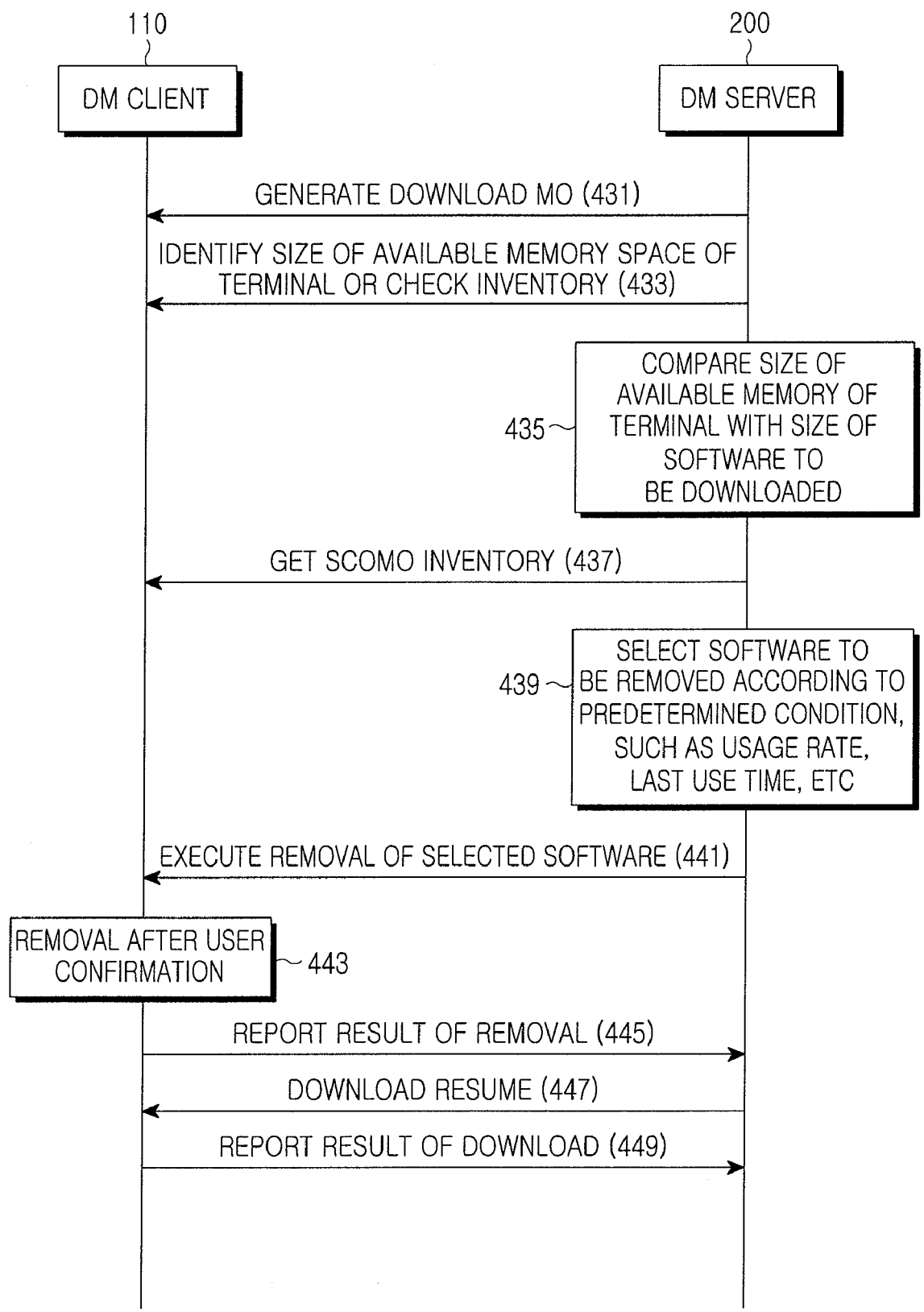
FIG. 11 is a view illustrating a downloading procedure according to another exemplary embodiment of the present invention.

Although an exemplary embodiment of the present invention has been described wherein a mobile terminal 100 compares the size of software to be downloaded and the size of an available memory area of the mobile terminal 100, and determines if a sufficient memory area is ensured, the present invention may be implemented in such a manner that the DM server 200 determines if the mobile terminal 100 ensures a memory area for downloading new software thereto, which is illustrated in FIG. 11.

FIG. 11 is a view illustrating a downloading procedure according to another exemplary embodiment of the present invention. In step 431, the DM server 200 generates and transmits a download MO for downloading/installing/updating new software to the DM client 110 of the mobile terminal 100. Then, in step 433, the DM server 200 transmits an available-memory-space-size identification request or an inventory check request to the mobile terminal 100 in order to acquire the size of the available memory area from the mobile terminal 100. Thereafter, in step 435, the DM server 200 compares the size of the obtained available memory area of the mobile terminal 100 with the size of the new software to be downloaded. When it is determined that the available memory capacity of the mobile terminal 100 is insufficient, the DM server 200 proceeds to step 437. Step 431 may be performed after steps 433 and 435 have been performed. Hereinafter, steps 437 to 449 are performed, which are the same as steps 409 to 421 of FIG. 10, respectively, except that step 437 may be omitted when the entire inventory of the mobile terminal is obtained in step 433.

According to exemplary embodiments of the present invention as described above, when a DM server attempts to download and install new software to a mobile terminal, the DM server preliminarily identifies whether or not the mobile terminal has a sufficient memory space. Then, if the memory space of the mobile terminal is insufficient, the DM server may not start a downloading task according to circumstances, or the DM server may perform the downloading/installing operations after searching for one or more pieces of software rarely used or unused in the recent past from pre-installed software and removing the searched software upon the user's acceptance so as to ensure a sufficient memory area, when the new software to be downloaded is important software.

As described above, according to exemplary embodiments of the present invention, when a DM server downloads and installs new software to a mobile terminal, the DM server identifies if an available memory area of the mobile terminal is sufficient by comparing a required memory size with the available memory area of the mobile terminal, and removes one or more pieces of software which are rarely used or have lower priorities when the available memory area of the mobile terminal is insufficient, so that it is possible to install the new software.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for managing internal software of a terminal by a device management server, the method comprising:
   transmitting, by the device management server, a software to be downloaded to the terminal;
   receiving a message indicating a lack of available memory capacity when the software is not installed in a memory of the terminal;
   acquiring, by the device management server, information about an available memory size of the terminal and at least one of a usage rate, a last used time, a total number of times of usage and an installed-software size for each software installed in the terminal;
   selecting, by the device management server, a plurality of removable software based on the available memory size and at least one of the usage rate, the last used time, the total number of times of usage and the installed-software size, so that a user of the terminal can select at least one software from the plurality of removable software;
   notifying, by the device management server, a list of the plurality of removable software to the terminal.

2. The method as claimed in claim 1, the method further comprising receiving, by the device management server, a result of removal of the plurality of removable software from the terminal; and
   transmitting, by the device management server, the software to be downloaded to the terminal.

3. The method as claimed in claim 2, wherein the list of the plurality of removable software including each of size of ensured memory space corresponding to each respective one of the plurality of removable software.

4. The method as claimed in claim 1, wherein the receiving of the message for the lack of available memory capacity comprises receiving by the device management server, from the terminal, a result of comparison between a size of an available memory space of the terminal and a size of the software to be downloaded, thereby identifying if the memory area required for downloading and installing the software to be downloaded is ensured in the terminal.

5. The method as claimed in claim 4, wherein the size of the software to be downloaded is stored in a download software size node of a download software component node in a software component management object (SCOMO), and is transmitted to the terminal.

6. The method as claimed in claim 1, wherein the selecting of the plurality of removable software comprises selecting by the device management server the removal-targeted software in a sequence from a smallest usage rate to a greatest usage rate from among the software installed in the terminal.

7. The method as claimed in claim 1, wherein the selecting of the plurality of removable software comprises:
   identifying a usage rate of each installed software based on the total number of times of usage; and
   selecting the removal-targeted software in a sequence from a smallest usage rate to a greatest usage rate.

8. The method as claimed in claim 1, wherein the selecting of the plurality of removable software comprises selecting by the device management server the removal-targeted software in a sequence from an oldest used time to a latest used time in terms of last used time.

9. The method as claimed in claim 1, wherein the selecting of the plurality of removable software comprises selecting by the device management server the removal-targeted software in ascending order of an importance level for each installed software.

10. The method as claimed in claim 1, wherein the at least one of the available memory size, the installed-software size, the usage rate, the last used time, and the total number of times of usage are respectively included in an available memory size node, an installed-software size node, a usage rate node, a last used time node, and a total execution number node of a deployed software component node in a software component management object (SCOMO), and are acquired.

11. A method for managing internal software of a terminal by the terminal, the method comprising:
    receiving a first software to be downloaded from a device management server;
    determining if sufficient memory is available for downloading and installing the first software in the terminal;
    transmitting a message indicating a lack of available memory capacity to the device management server when sufficient memory is not available in the terminal;
    transmitting an available memory size of the terminal and information regarding each of software installed on the terminal to the device management server according to a request of the device management server;
    receiving a list of a plurality of removable installed software, wherein the plurality of removable installed software is selected by the device management server based on the information regarding the software installed on the terminal so that a user of the terminal can select at least one software from the plurality of removable software;
    removing at least one installed software among the plurality of removable installed software when the terminal receives a removal acceptance input from the user;
    installing the received first software from the device management server in the memory of the terminal,
    wherein the information regarding the software installed on the terminal comprises at least one of an installed-software size, a usage rate, a last used time and a total number of times of usage of the software installed in the terminal.

12. The method as claimed in claim 11, wherein the at least one of the installed-software size, the available memory size, the usage rate, the last used time and the total number of times of usage are respectively included in an available memory size node, an installed-software size node, a usage rate node, a last used time node, and a total execution number node of a deployed software component node in a software component management object (SCOMO).

13. The method as claimed in claim 11, wherein the list of the plurality of removable software includes a size of each ensured memory space corresponding to respective one of the plurality of removable software.

14. The method as claimed in claim 11, wherein the determining if sufficient memory is available comprises comparing a size of an available memory space of the terminal and a size of the first software to be downloaded.

15. The method as claimed in claim 14, wherein the size of the first software to be downloaded is included in a download software size node of a download software component node in a software component management object (SCOMO), and is transmitted to the terminal.

16. The method as claimed in claim 11, wherein the determining of the plurality of removable installed software comprises:
    identifying a usage rate of each installed software based on the total number of times of usage; and determining the installed software that may be removed based on a sequence from a smallest usage rate to a greatest usage rate.

17. The method as claimed in claim 11, wherein the determining of the plurality of removable installed software comprises determining based on a sequence from an oldest used time to a latest used time in terms of last used time.

18. The method as claimed in claim 11, wherein the determining of the plurality of removable installed software comprises determining based on an ascending order of an importance level for each installed software.

19. The method as claimed in claim 11, wherein the removing the at least one installed software comprises:

providing the list of the plurality of removable installed software and a size of each ensured memory space corresponding to respective ones of the plurality of removable installed software through a user interface;

removing the at least one installed software among the plurality of removable installed software upon a user's acceptance input; and providing a size of a memory area available if the removal of the at least one installed software is accepted by the user, in comparison with a size of a memory capacity required for downloading/installing the first software to be downloaded.

20. The method as claimed in claim 19, wherein when the size of the memory area available is provided in comparison with the size of the memory capacity required for downloading/installing the software to be downloaded, reference is made of an installed-software size node of a deployed software component node and an installed-software size node of a delivered software component node in a software component management object (SCOMO).

* * * * *